United States Patent [19]

Birck

[11] 4,177,361
[45] Dec. 4, 1979

[54] SIGNALING TONE TRANSPARENT ECHO SUPPRESSOR

[75] Inventor: Michael J. Birck, Hinsdale, Ill.

[73] Assignee: Tellabs, Inc., Lisle, Ill.

[21] Appl. No.: 860,160

[22] Filed: Dec. 14, 1977

[51] Int. Cl.² ............................................. H04B 3/20
[52] U.S. Cl. ............................... 179/170.2; 179/170.8
[58] Field of Search .......... 179/84 VF, 170 R, 170.2, 179/170.4, 170.6, 170.8

[56] References Cited

U.S. PATENT DOCUMENTS

| | | | |
|---|---|---|---|
| 3,069,501 | 12/1962 | Gilman et al. | 179/170.2 |
| 3,280,274 | 10/1966 | Schoeffler | 179/170.2 |
| 3,349,191 | 10/1967 | Mann | 179/84 VF |
| 3,769,466 | 10/1973 | Von Pfeil et al. | 179/170.2 |
| 4,018,996 | 4/1977 | Kahn | 179/84 VF |
| 4,115,668 | 9/1978 | Skrovanek et al. | 179/170.2 |

Primary Examiner—Bernard Konick
Assistant Examiner—Randall P. Myers
Attorney, Agent, or Firm—Gary, Juettner & Pyle

[57] ABSTRACT

An improved echo suppressor for use at intermediate points in a telephone transmission facility, whereat both speech signals and single frequency signaling tones may simultaneously be present, provides voice-switched echo control without affecting network signaling. In one mode of operation, during periods of critical signaling tone transmission and while high level or augmented tone is present, such as during dial pulsing, the echo suppressor is automatically disabled and completely transparent to the tone, whereby the signaling tone may pass therethrough completely without distortion. In another mode of operation, during periods of continuous low level signaling tone, the tone is blocked from an attenuation control portion of the echo suppressor and is reinserted into the transmission facility thereafter, irrespective of the presence or absence of speech energy in the facility. In this manner, whenever SF signaling tone is present at an input to the detector it is present at a corresponding output therefrom, and the echo suppressor provides voice-switched echo control and accommodates network signaling without interference to either.

24 Claims, 6 Drawing Figures

SIGNALING TONE TRANSPARENT ECHO SUPPRESSOR

BACKGROUND OF THE INVENTION

The present invention relates to echo suppressors, and in particular to an improved single frequency (SF) signaling tone transparent echo suppressor for long distance telephone communication systems.

Long distance telephone communication facilities generally comprise four-wire transmission circuits between central switching offices in different local exchange areas, and two-wire transmission circuits within each exchange area connecting the individual subscribers therein with the switching office. A call between subscribers in different exchange areas is carried over a two-wire transmission circuit within each of the areas and a four-wire transmission circuit extending between the central switching offices of the areas, with conversion of speech energy between each two-wire circuit and the four-wire circuit, and vice versa, being effected by a hybrid circuit. Ideally, the hybrid circuit ports perfectly match the impedances of the two-wire and the four-wire circuits, and even more importantly the hybrid circuit balance network impedance perfectly matches the impedance of the two-wire circuit, so that signals transmitted from one exchange area to the other will not be reflected or returned to the one area as an "echo" signal. Unfortunately, due to impedance differences which inherently exist between two-wire as well as four-wire circuits, and because impedances must be matched at each frequency in the voice band, it is virtually impossible to provide a hybrid balance network which will ideally match the impedance of any particular two-wire transmission circuit. Echo is, therefore, characteristically part of a long distance telephone system.

Echo of the type described above is tolerable, so long as the time delay in the echo path is relatively short, shorter than, say, 40 or 45 milliseconds. To reduce echo signals in longer delay telephone circuits to a tolerable level, echo suppressors are used for selectively inserting attenuation or suppression loss into transmit and/or receive channels of four-wire transmission circuits characterized by appreciable propagation delay to suppress the echo signals. Without echo suppression a portion of a speaking subscriber's voice signal, carried by two of the four wires to a listening subscriber, is reflected back to him over the other two wires and is heard as an echo of his own voice. An echo signal which has a return delay of 40-45 milliseconds or longer is at the very least disturbing and possibly utterly confusing to an average speaker, and must be removed. Of course, echo delay times in excess of 45 milliseconds are not uncommon, and in modern satellite communications the delays often exceed 600 milliseconds.

Echo suppressors may be either of the "split" or "full" type. With split echo suppressors, a separate echo suppressor is used for each of a near end and a far end subscriber, with the near end echo suppressor protecting the far end subscriber against his own voice echo signal, and with the far end echo suppressor protecting the near end subscriber against his own echo. With a full echo suppressor, only a single echo suppressor is required in a four-wire transmission circuit, but such suppressors are usually effective only where echo return delay is relatively short. Consequently, split echo suppressors are most commonly employed in long distance telephone communication systems.

Conventionally, split echo suppressors have three distinct operating modes for different transmit and receive channel signal conditions. Considering only the near end echo suppressor, since the suppressors at the near and the far ends are generally identical or at least provide identical suppression functions, the operating mode of the suppressor usually is as follows: (1) when the transmit and receive channel signal levels are representative of neither subscriber speaking, the suppressor is in a quiescent mode and attenuation is removed from both channels; (2) when the transmit channel signal level is representative of the near end subscriber not speaking and the receive channel signal level is representative of the far end subscriber speaking and for a predetermined suppression hangover time thereafter, the echo suppressor operates in a suppression mode in which relatively high suppression or attenuation, typically on the order of 60 dB, is switched into the transmit channel to protect the far end subscriber against an echo signal of his own voice reflected back from the near end over the transmit channel, and (3) when the transmit channel signal level is representative of the near end subscriber speaking and for a predetermined hangover time thereafter, whether or not the far end subscriber is simultaneously speaking, the suppressor operates in a break-in mode and removes the relatively high attenuation from the transmit channel and inserts relatively low attenuation, typically 6 dB, into the receive channel.

In addition to voice signals, such four-wire transmission circuits may also carry single frequency (SF) signaling tones. The SF tones usually comprise a 2600 Hz signal which is transmitted back and forth between distant central switching offices and provides a means of communication or of conveying information between the circuitry at the offices, whereby a transmission path between distant subscribers may be established and controlled. For example, in the most common type of signaling scheme SF tone ordinarily is continuously present on an idle four-wire transmission circuit between distant central switching offices, with each office transmitting an SF tone to the other. Upon a subscriber going off hook or gaining access to the line, the SF tone transmitted by his office to the other is interrupted, thereby indicating to the remote office that a calling subscriber is connected with the line. The SF tone may then be pulsed in accordance with a number dialed by the calling subscriber, so that circuitry at the distant switching office is controlled to establish a connection between the calling subscriber and a particular called subscriber. Similarly, the central offices effect changes in the SF tone to provide, for example, a ringing indication to the calling subscriber. Later, upon the subscribers hanging up at the termination of their conversation, the SF tone is effected by each switching office to indicate to the other that the connection has been interrupted. During the period when a communication link is established between speaking subscribers, SF signaling tones and voice signals may or may not be simultaneously present on the transmission facility.

Since the 2600 Hz SF signaling tones are within the voice frequency band, in transmission circuits which use echo suppressors some means must be provided to prevent SF signaling tones from entering the echo suppressors. Heretofore, an echo suppressor used in a conventional application has been located on the terminal equipment side of SF signaling units, which prevents SF tones from entering the echo suppressor. If such an echo suppressor were inserted at an intermediate point between signaling units, however, the SF signaling tones would be adversely affected or perhaps completely interrupted by the echo suppressor, resulting in loss of switching circuit control functions. Furthermore, the presence of inband signaling tones interferes with the ability of the echo suppressor to reliably detect speech signals, thus interfering with its operation. Thus, the result of a conventional echo suppressor located within an SF signaling link is interference with both signaling and echo control.

One previous technique which enables use of an echo suppressor at an intermediate point between signaling units contemplates disabling the echo suppressor during periods when SF tone is present, so that the tone is not attenuated and the circuit switching functions are not adversely affected. A disadvantage of this technique is that upon the simultaneous presence of speech energy and signaling tones the echo suppressor is disabled and permits echo signals to return to a speaking party. Another disadvantage is the simultaneous appearance of signaling tone energy and another continuous signal, such as dial tone, will result in failure to detect the signaling tone, resulting in failure to properly control the circuit.

Another technique is to position a pair of SF signaling units at the input ports to and output ports from an echo suppressor, and to interconnect the units to block application of SF tone to the echo suppressor and to reinsert the tone into the line subsequent thereto. Such a technique is, to say the least, expensive and cumbersome to implement.

It would therefore be extremely desirable to provide a voice-switched split-type echo suppressor for application at intermediate points in four-wire transmission facilities, which would provide conventional voice-switched echo control without affecting network signaling, even in applications characterized by simultaneous presence of speech or other energy and signaling tones.

OBJECTS OF THE INVENTION

An object of the present invention is to provide a voice-switched split-type echo suppressor for use at an intermediate point between SF signaling units in a four-wire telephone transmission facility, which provides conventional voice-switched echo control without affecting network signaling.

Another object of the invention is to provide such an echo suppressor which provides voice-switched echo control without affecting network signaling, even upon the simultaneous occurrence of speech energy and signaling tones on the transmission line.

A further object of the invention is to provide such an echo suppressor which automatically is disabled during critical periods of intermittent SF tone transmission and while high level SF tone is present to prevent signaling distortion during such periods.

Yet another object of the invention is to provide such an echo suppressor in which steady low level SF tone in the transmit channel is removed prior to break-in detection and suppression circuitry of the echo suppressor, and is reinserted into the channel thereafter.

A still further object of the invention is to provide an echo suppressor which is transparent to inband SF signaling tones, and which provides improved and reliable insertion and removal of suppression loss into and from the transmit and receive channels of a four-wire voice facility.

Another object of the invention is to provide an echo suppressor that will function properly in and unaffected by the presence of SF signaling tones.

SUMMARY OF THE INVENTION

In accordance with one embodiment of the apparatus of the invention, an echo suppressor for telephone systems having separate transmit and receive channels on which single frequency (SF) signaling tone is at least occasionally present comprises an attenuation pad for the transmit channel, and means for being coupled with the receive channel for detecting the level of voice signal energy thereon and for inserting and removing the attenuation pad into and from the transmit channel in accordance therewith. Also included is an attenuation pad for the receive channel, and means for being coupled with the transmit channel for detecting the level of voice signal energy thereon and for inserting and removing the receive channel attenuation pad into and from the receive channel in accordance therewith, and for removing the transmit channel attenuation pad from the transmit channel upon inserting the receive channel attenuation pad into the receive channel. An SF signaling tone attenuation means is provided for the transmit channel, and means for sensing the presence or absence of SF tone on the transmit channel inserts and removes the tone attenuation means into and from the transmit channel, prior to the transmit channel energy level detecting means and attenuation pad, in accordance therewith. An SF signaling tone generator is also provided for the transmit channel, and the sensing means is coupled with the tone generator for connecting the generator with the transmit channel, subsequent to the transmit channel detecting means and attenuation pad, whenever the tone attenuation means is inserted into the transmit channel, and for disconnecting the generator from the channel whenever the tone attenuation means is removed therefrom.

In a preferred embodiment of the invention, the tone sensing means removes the tone attenuation means and disconnects the tone generator from the transmit channel in the absence of SF tone thereon, and delay means is coupled with the sensing means. The delay means delays insertion of the tone attenuation means and connection of the tone generator into the transmit channel for a predetermined time after each occurrence of SF tone on the channel, and the sensing means is coupled with the transmit and receive channel attenuation pads for removing the pads from the channels for the predetermined time upon each occurrence of SF tone thereon and irrespective of the transmit or receive channel signal levels. In this manner, upon each occurrence of SF tone on the transmit channel and during the predetermined time, the tone passes unaltered through the echo suppressor. After the predetermined time, the tone is then blocked by the tone attenuation means prior to the transmit channel detecting means and attenuation pad, and is reinserted onto the channel thereafter by the tone generator, whereby the echo suppressor operates in the simultaneous presence of voice signals and signaling tone without interference to either.

The tone sensing means advantageously comprises means for comparing the level of SF signaling tone energy on the transmit channel with an attenuated aggregate level of all of the energy thereon and for generating an output indicative of the presence of signaling tone upon the tone energy level exceeding the attenuated aggregate level by a first predetermined amount, whereby spurious indications of the presence of SF signaling tone are minimized. To minimize inadverent removal of the tone attenuation means and tone generator from the transmit channel in response to relatively high level signal or noise energy, means are coupled with the delay means for decreasing the sensitivity of the comparing means to the aggregate level of the energy after the predetermined time, so that the signaling tone level must decrease to a second and smaller predetermined level in excess of the attenuated aggregate energy level for removal of the tone attenuation means and the tone generator from the transmit channel.

In accordance with a method of the invention, voice echo control on a telephone system having separate transmit and receive channels on which SF signaling tone is at least occasionally present is provided by detecting the level of speech energy on the receive channel and inserting and removing attenuation into and from the transmit channel at a first point thereon in accordance therewith. The level of speech energy at a second point on the transmit channel is detected, and attenuation is inserted into and removed from the receive channel in accordance therewith and attenuation, if any, is removed from the transmit channel when attenuation is inserted into the receive channel. Also, the presence or absence of SF signaling tone on the transmit channel is sensed at a point prior to the first and second points and, upon sensing the presence of the tone, the tone is removed from the transmit channel prior to the first and second points and reinserted back thereon subsequent to the points.

The foregoing and other objects, advantages and features of the invention will become apparent from a consideration of the following detailed description, when taken in conjunction with the accompanying drawings.

DETAILED DESCRIPTION

Figure 1:
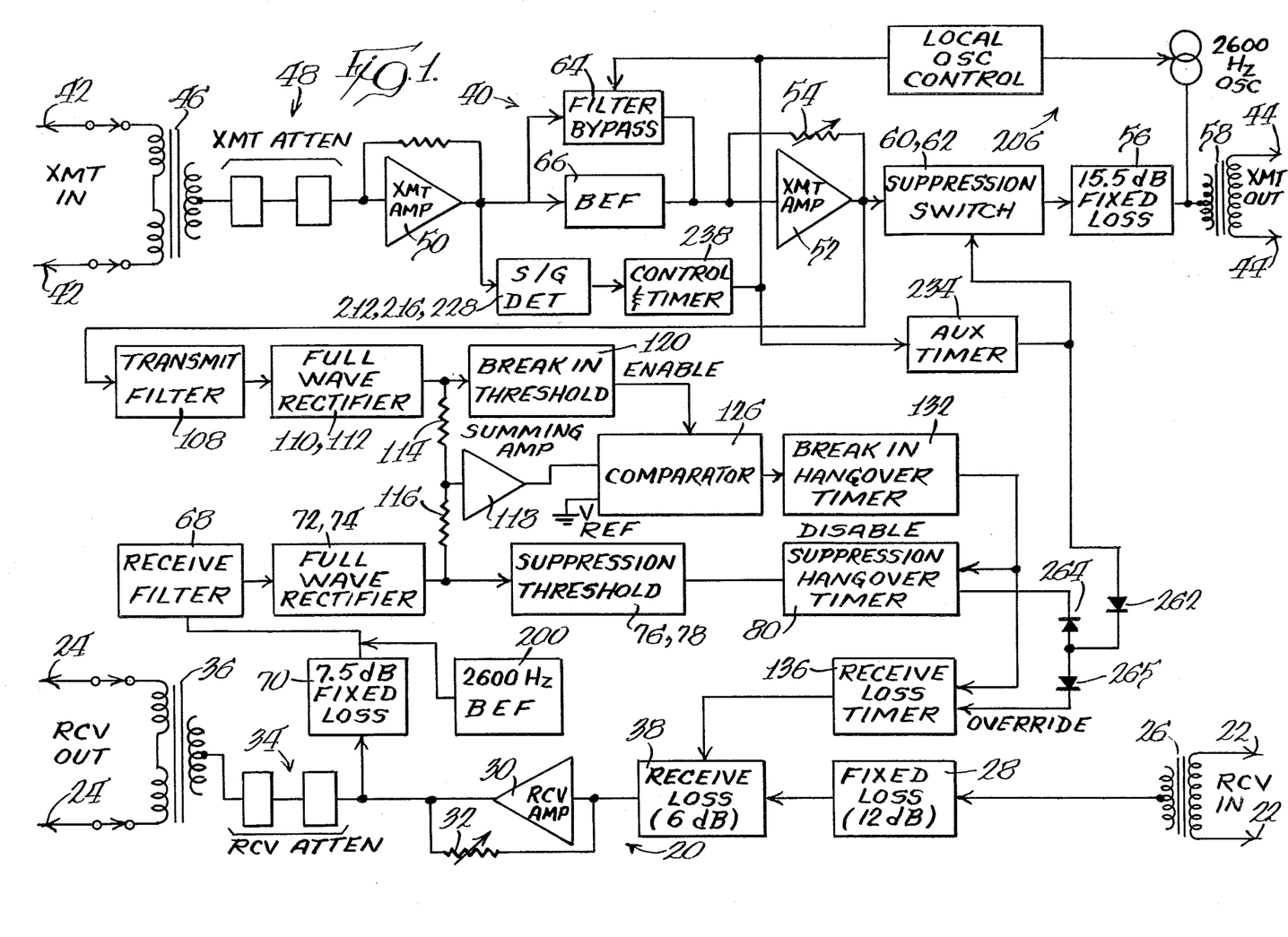
FIG. 1 is a block diagram of an SF signaling tone transparent echo suppressor embodying the features of the present invention.
Figures 2, 2A:
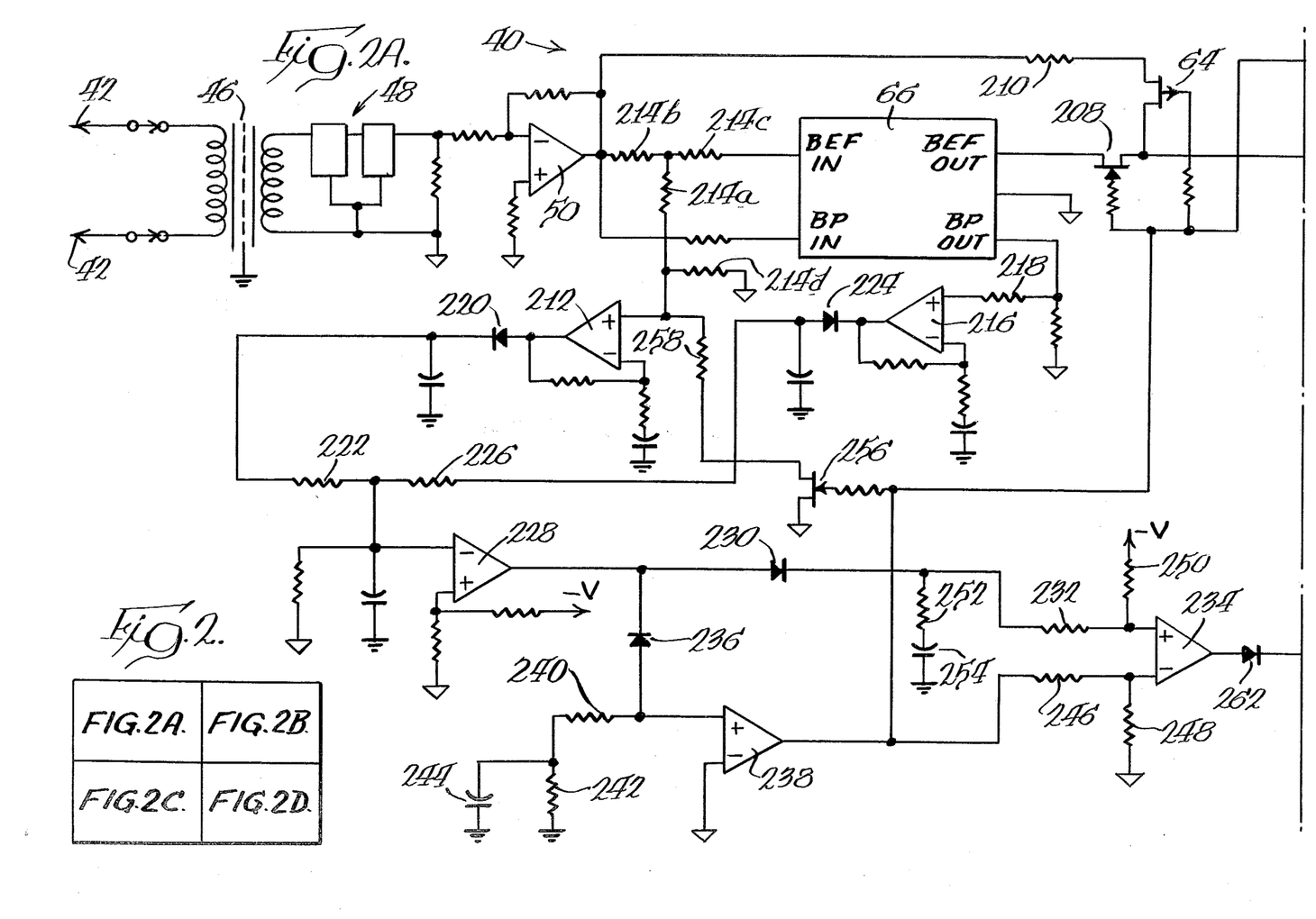
FIGS. 2a-2d together comprise a schematic representation of the echo suppressor.
Figure 2B:
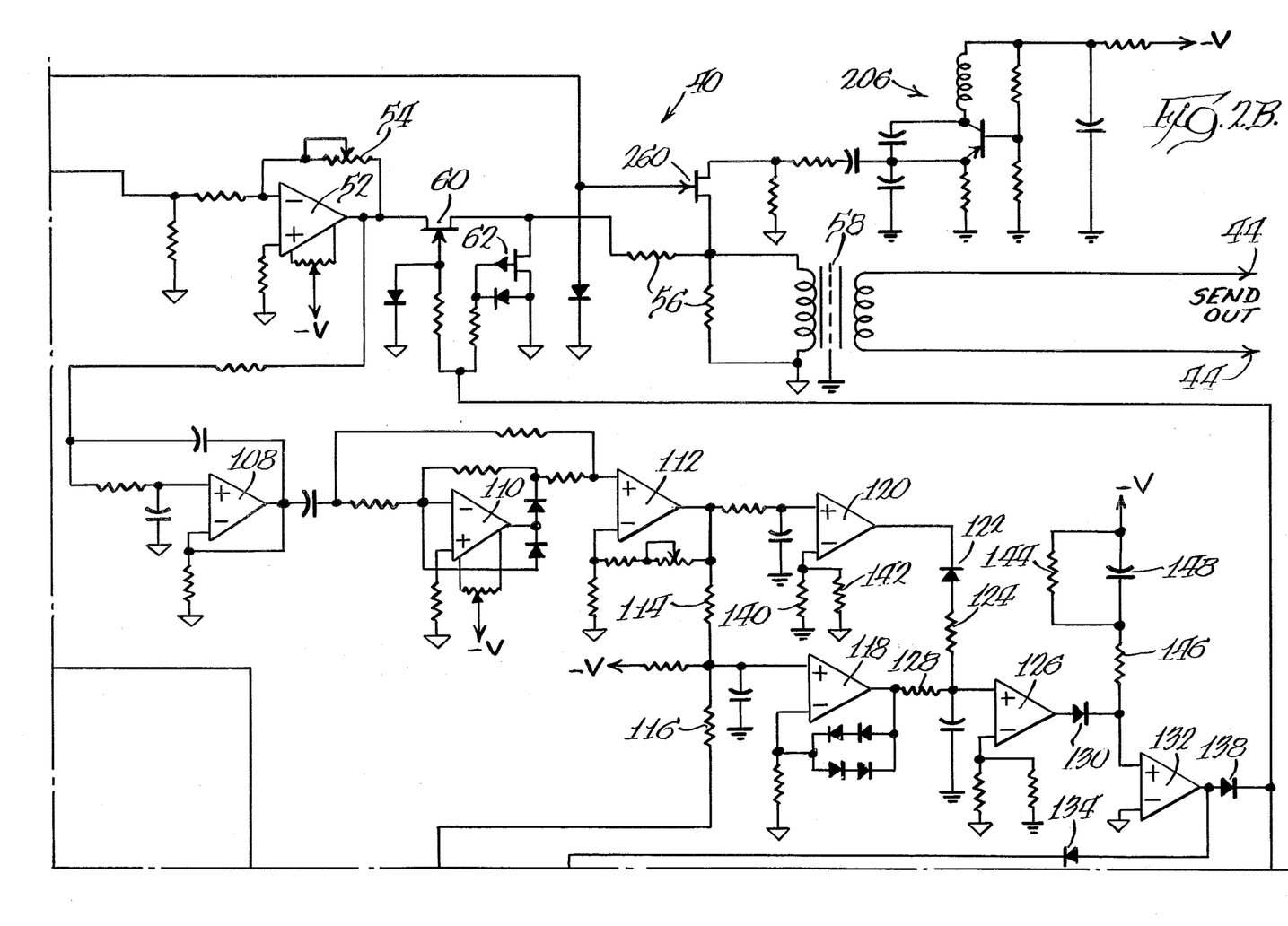
Figure 2C:
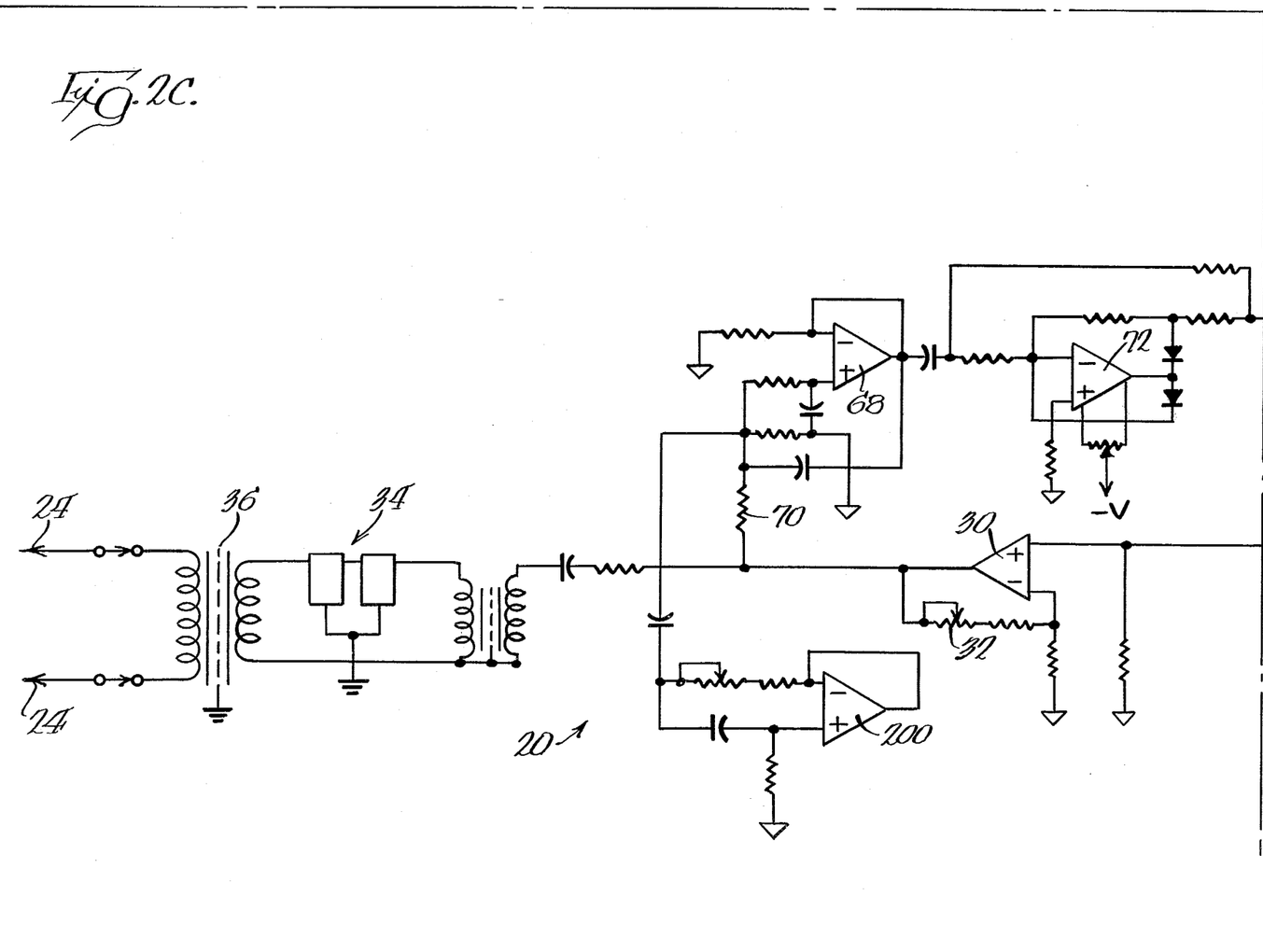
Figure 2D:
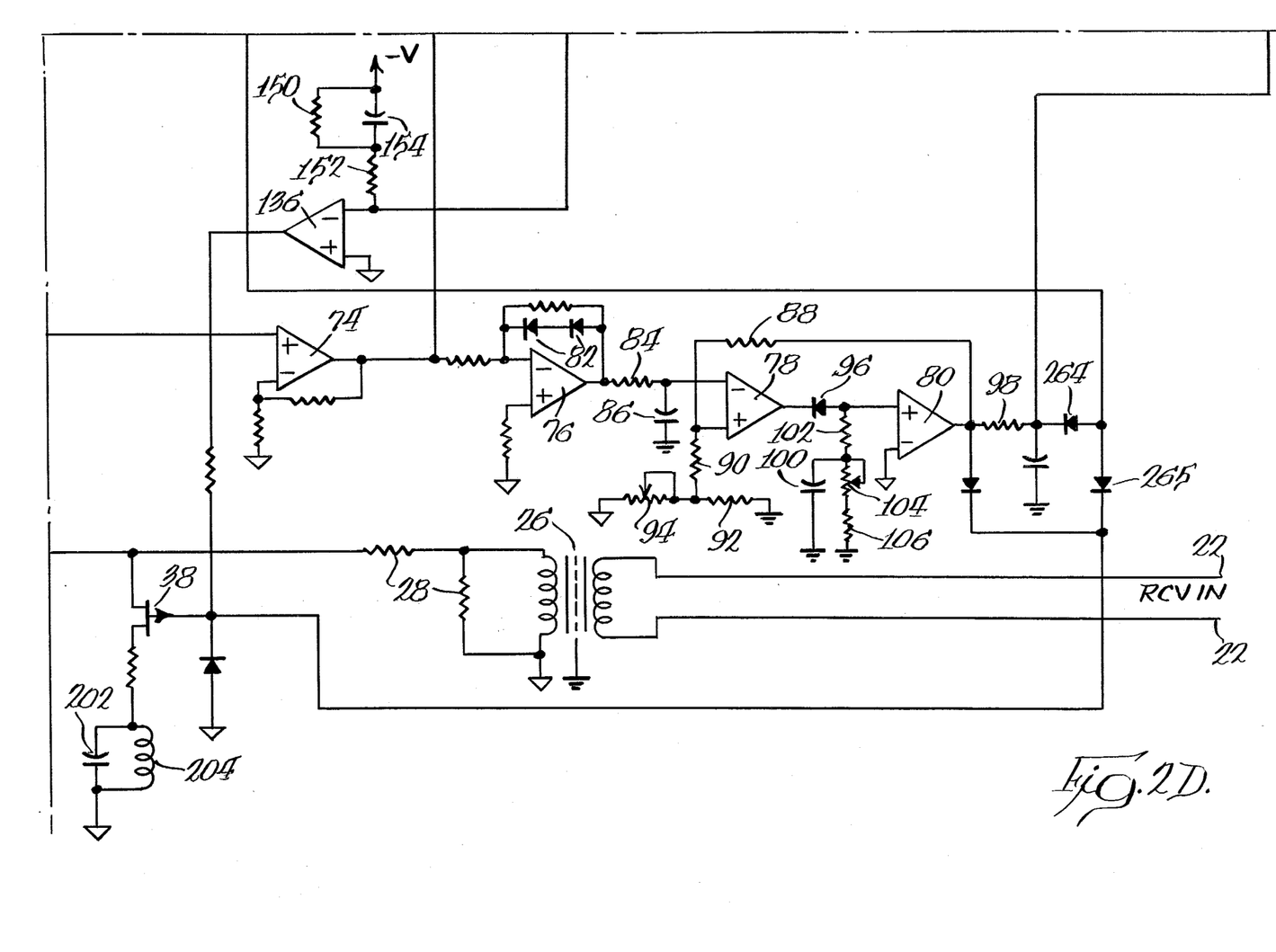

FIG. 1 of the drawings illustrates in block diagram form a single frequency (SF) signaling tone transparent echo suppressor in accordance with the teachings of the present invention. The echo suppressor is a voice-switched split-type echo suppressor particularly adapted for use at points between SF signaling units in four-wire long distance telephone transmission facilities, and provides conventional voice-switched echo control without affecting network signaling, even in applications characterized by simultaneous presence of speech energy and signaling tones.

Long distance telephone communication systems generally comprise four-wire transmission circuits between central switching offices in different local exchange areas, and two-wire transmission circuits within each exchange area connecting the individual subscribers therein with the equipment at the local switching office. A call between subscribers in different exchange areas is carried over a two-wire transmission circuit within each of the local areas, and over a four-wire transmission circuit between the areas, with conversion of speech energy from the two-wire circuits to the four-wire circuit, and vice versa, being effected by a hybrid circuit. As is conventional, one pair of the wires in the four-wire transmission circuit carries the voice signals from one subscriber to the other, and the other pair carries the voice signals from the other subscriber to the one. Ideally, the hybrid circuit port impedances perfectly match the impedances of the two-wire and the four-wire transmission circuits, and the hybrid circuit balance network perfectly matches the impedance of the two-wire circuit, so that voice signals transmitted over one pair of wires from one exchange area to the other will not be reflected or returned over the other pair to the speaker as an echo signal. Due to the impedance differences which inherently exist between two-wire as well as four-wire transmission circuits, and because impedances must be matched at each frequency in the voice band, it is virtually impossible to provide a hybrid circuit which will perfectly match any particular two-wire transmission circuit. Echo is, therefore, inherent in long distance telephone systems. Consequently, echo suppressors are required to reduce the echo signals to a tolerable level.

To facilitate describing long distance telephone systems, the systems are usually considered to have near and far ends, the near end merely being that end of the facility which is nearby or close and the far end being an opposite or distant end. Similarly, subscribers using such facilities are referred to as near and far end subscribers, with the near end subscriber being connected with the near end of the system and the far end subscriber connected with the far end of the system. For either subscriber, the pair of wires at his end of the four-wire circuit over which he receives the voice signals from the distant subscriber is considered as comprising a receive channel, and the pair of wires over which his voice signal is transmitted to the distant subscriber is considered as comprising a transmit channel. Thus, a pair of wires which comprises a transmit channel at one end of the circuit defines a receive channel at an opposite end, and vice versa.

With a split echo suppressor of the type forming the subject matter of the present invention, a separate echo suppressor is used at each of the near and the far ends of the four-wire transmission circuit, with the echo suppressor at the near end protecting the far end subscriber against his own echo, and with the echo suppressor at the far end protecting the near end subscriber against his echo. Since the near and far end echo suppressors may be identical, in describing the invention only one echo suppressor, which is considered to be located at the near end of a transmission circuit, has been illustrated and described.

As is conventional, in its echo suppressing function the echo suppressor of the invention has three distinct modes of operation for different transmit and receive channel signal conditions. When the transmit and receive channel signal levels are representative of neither subscriber speaking, the suppressor is in a quiescent mode and attenuation is removed from both the transmit and the receive channels. When the transmit channel signal level is representative of the near end subscriber not speaking and the receive channel signal level is representative of the far end subscriber speaking and for a predetermined suppression hangover time thereafter, the echo suppressor operates in a suppression mode in which relatively high suppression or attenuation, typically 60 dB, is switched into the transmit channel to protect the far end subscriber against an echo reflected back from the near end. Should the transmit channel signal level become representative of the near end subscriber speaking and for a predetermined hangover time thereafter, whether or not the far end subscriber is simultaneously speaking, the suppressor operates in a break-in mode and removes the relatively high attenuation from the transmit channel and inserts relatively low attenuation, typically 6 dB, into the receive channel.

In addition to voice signals, long distance circuits often also carry SF signaling tones, which usually comprise a 2600 Hz signal transmitted between distant switching offices to provide a means of communicating switching function information between the offices, whereby a transmission path between distant subscribers may be established and controlled. SF signaling tones are generated by SF signaling units, and must be free to travel between the signaling units in order to maintain the control function over the transmission path. Consequently, echo suppressors which provide a purely echo suppressing function cannot be located at points between the signaling units since they would recognize the SF tones as voice signals and insert attenuation into the lines, thereby preventing transmission of the tones. Similarly, by enabling the echo suppressor, the SF tones would cause interference with the transmission of voice signals. Accordingly, echo suppressors used in conventional applications have heretofore been located on the terminal equipment or subscriber side of SF signaling units, which prevents SF tone from entering the echo suppressor and eliminates the possibility of interference with both SF signaling and suppression.

In accordance with one feature of the invention which enables the echo suppressor to advantageously be used in a transmission line at points between SF signaling units, means are provided for making the echo suppressor transparent to inband or voice band SF signaling tones. During periods of critical SF tone signaling on the transmit channel when voice signals would not be present, such as during dial pulsing and while high level or augmented SF tone is present, which briefly occurs each and every time SF tone is initially applied over the transmission line, the echo suppressor is automatically disabled and made completely transparent to the SF tone. During periods of steady low level SF tone on the transmit channel when speech signals may or may not be present, the tone is blocked from an attenuation control portion of the echo suppressor and reinserted back into the channel subsequent thereto, irrespective of the presence or absence of speech energy on either channel. The echo suppressor is thus able to provide voice-switched echo control without affecting network signaling, even upon the simultaneous presence of speech energy and signaling tones.

Referring also to FIGS. 2a-d, which illustrate in schematic form the SF signaling tone transparent echo suppressor of the invention, the echo suppressor includes a receive channel, indicated generally at 20, which is connectable in series with the receive channel of a four-wire transmission circuit toward a near end subscriber by means of a pair of input terminals 22 and a pair of output terminals 24. The receive channel includes an input transformer 26, a fixed loss circuit comprising a pair of resistors 28, an amplifier 30 having a variable gain as determined by the setting of a potentiometer 32, an attenuation circuit indicated generally at 34 and an output transformer 36. Echo suppression or attenuation is selectively insertable into the channel by a receive loss circuit or attenuation pad shown as a field-effect transistor (FET) 38. The components as interconnected form a complete path through the receive channel between the input and output terminals, and the arrangement is such that when the FET 38 is nonconductive and removed from the receive channel signals at the input terminals pass through the channel and exit from the output terminals without change in level, but when the FET is conductive and inserted into the channel the signals are attenuated by about 6 dB.

The echo suppressor also includes a transmit channel, indicated generally at 40, which is connectable in series with the transmit channel of a four-wire transmission circuit toward the near end subscriber by means of a pair of input terminals 42 and a pair of output terminals 44. The transmit channel includes an input transformer 46, an attenuation circuit indicated generally at 48, a pair of amplifiers 50 and 52 with the gain of the amplifier 52 being adjustable by means of a potentiometer 54, a fixed loss circuit comprising a pair of resistors 56 and an output transformer 58.

Echo suppression or attenuation is selectively insertable into the channel by an attenuation pad shown as a pair of FETs 60 and 62, which together form a suppression switch for the channel. The P-channel FET 60 is in series with the transmit channel and the N-channel FET 62 is connected as a shunt thereacross, and during insertion of suppression the FET 60 is nonconductive and the FET 62 is conductive, and when suppression is removed the states of conductivity are reversed. The arrangement is such that when suppression is removed from the transmit channel signals at the input terminals pass through the channel and exit from the output terminals without change in level, but when suppression is inserted into the channel the signals are attenuated by about 60 dB. In the absence of SF signaling tones on the channel a filter bypass circuit, which includes a FET 64, provides a shunt path around a band elimination filter 66 which is responsive to a narrow band of frequencies centered about SF signaling tones, as will be described.

As connected in a four-wire circuit, voice signals at the terminals 22 from a far end or distant subscriber pass through the receive channel 20 and exit from the terminals 24 for transmission to the near end subscriber, and voice signals at the terminals 42 from the near end subscriber pass through the transmit channel 40 and exit from the terminals 44 for transmission to the far end subscriber. To detect the presence of a receive channel signal level which is representative of the far end subscriber speaking, and to insert attenuation into the transmit channel in response thereto to prevent the far end subscriber from hearing an echo signal of his own voice, a low pass filter which includes an operational amplifier (op amp) 68 is connected with the output from the receive channel op amp 30 through a fixed loss circuit which includes a resistor 70. The low pass filter attenuates signal energy above 3800 Hz, so that relatively high frequency noise on the receive channel is not passed therethrough, but relatively low frequency voice signals are. The output from the filter is applied to a full wave rectifier which includes a pair of op amps 72 and 74, which provide at the output from the op amp 74 a full wave rectified negative going a.c. signal representative in level with the level of the signal on the receive channel.

The rectified output from the op amp 74 is applied to a suppression threshold circuit which monitors the level of the output and switches suppression into the transmit channel whenever the level increases to a value indicative of the presence of voice signals on the receive channel. More particularly, the suppression threshold circuit includes a pair of op amps 76 and 78 with the op amp 76 receiving the rectifier output at an inverting input thereto. The noninverting input to the op amp 76 is connected with a source of reference potential, and a pair of diodes 82 are connected between the output from and the inverting input to the op amp to provide a nonlinear gain. The output from the op amp 76 is thus a positive going nonlinear representation of the rectified signal at the inverting input thereto.

The output from the amplifier 76 is applied through a resistor 84 both across a capacitor 86 and to an inverting input to the op amp 78, the noninverting input to which is connected both with the output from an op amp 80 through a resistor 88 and with a source of potential through a pair of resistors 90 and 92 and a potentiometer 94.

In the absence of energy on the receive channel, the outputs from the op amps 74 and 76 are at circuit common potential, and the outputs of the op amps 78 and 80 are at positive supply potential or ground. Upon the occurrence of speech energy, negative going transitions occur at the output from the op amp 74, which cause positive going transitions at the output from the suppression threshold op amp 76. For low amplitude positive transitions at the output from the op amp 76, as might occur when the level of the rectifier output signal is quite low, or for a solitary one or two relatively large amplitude positive transitions, the capacitor 86 does not charge sufficiently to develop thereacross and at the inverting input to the op amp 78 a positive voltage of an amplitude greater than the amplitude of the voltage at the noninverting input thereto, and the output from the op amp 78 remains at ground. Upon the occurrence of repetitive positive transitions of sufficient amplitude at the output from the op amp 76, however, a voltage is developed across the capacitor 86 which is more positive than the threshold voltage at the noninverting input to the op amp 78. When this occurs, the output from the op amp 78 goes negative at a high rate of gain, and is coupled through a diode 96 to a noninverting input to the op amp 80 to provide at the output therefrom a negative going signal. The output from the op amp 80 is applied both through the resistor 88 to the noninverting input to the op amp 78 to reduce the voltage thereat, and through a resistor 98 to the gates of the transmit channel suppression FETs 60 and 62. When the output of the op amp 80 is positive the FET 60 is conductive and the FET 62 is nonconductive, and there is no attenuation or suppression in the transmit channel. Upon the output going negative, however, the FET 60 is rendered nonconductive and the FET 62 conductive to insert approximately 60 dB of attenuation into the channel, the FET 62 at this time providing impedance matching for the output transformer 58. In this manner, upon the occurrence of speech energy in the receive channel of sufficient level, attenuation is automatically inserted into the transmit channel to prevent voice echo signals from being transmitted therethrough.

Attenuation is thus inserted into the transmit channel upon the receive channel signal level increasing sufficiently to cause the nonlinear gain op amp 76 to provide at the inverting input to the op amp 78 a voltage which is positive with respect to that at the noninverting input. It is to be noted, however, that upon attenuation being inserted into the transmit channel as the output from the op amp 80 goes negative, because of the resistor 88 the level of the voltage at the noninverting input to the op amp 78 is reduced. Accordingly, the threshold level with which the integrated output from the nonlinear amplifier 76 is compared for insertion of attenuation into the transmit channel is reduced upon insertion, and the output from the op amp 76 must then decrease to below the initial threshold level, or to a second and lower threshold level, for attenuation to be removed from the transmit channel. This advantageously ensures that suppression will not be spuriously removed from the transmit channel, particularly in the case where the far end subscriber speaks softly. Upon the rectifier output later decreasing to a level whereat the amplitude of the voltage at the inverting input to the op amp 78 becomes less than that at the noninverting input thereto, or decreases to the second and lower threshold level, the output from the op amp 78 returns to ground. This causes the output from the op amp 80 to return to ground and remove attenuation from the transmit channel after a delay, typically on the order of 70 milliseconds, determined by the discharge rate of a capacitor 100 connected with the non-inverting input to the op amp through a resistor 102 and in parallel with a potentiometer 104 and a resistor 106, the potentiometer 104 being adjustable to control the duration of the delay.

Without more, two-way conversation would be impossible, since attenuation inserted into the transmit channel when the far end subscriber is speaking would prevent any transmission of a voice signal from the near end to the far end subscriber. In other words, the near end subscriber would not be able to interrupt the far end subscriber while the far end subscriber was speaking, but rather would have to wait until he stopped speaking for a period of time sufficient to cause suppression to be removed from the transmit channel.

To allow interruption of the far end subscriber by the near end subscriber means are provided, operative when the transmit channel signal level simultaneously exceeds a break-in threshold level and is higher in level than the receive channel signal level, to remove attenuation, if any, from the transmit channel and to insert in the receive channel, by rendering the FET 38 conductive, a relatively low attenuation on the order of 6 dB. This is accomplished by connecting the output of the transmit channel amplifier 52 with a lowpass filter which includes an op amp 108. The filter sharply attenuates signals having a frequency above 3800 Hz to prevent substantially all but voice signals from passing therethrough, and is connected with the input to a full wave rectifier which includes a pair of op amps 110 and 112. The output from the rectifier is taken at the output from the op amp 112, and is a positive going full wave rectified a.c. signal representative of the voice signal on the transmit channel.

The output from the op amp 112 and the output from the op amp 74, which is a negative going representation of the voice signal on the receive channel, are applied through respective identical summing resistors 114 and 116 to a noninverting input to a nonlinear summing op amp 118, which adds the positive signals representative of transmit channel signal levels to the negative signals representative of receive channel signal levels to produce a net output that is either positive or negative, depending upon the instantaneous signal levels in the two channels. The output from the op amp 112 is also applied to a noninverting input to a break-in threshold op amp 120, the output of which is connected through a diode 122 and a resistor 124 with a noninverting input to a comparator op amp 126, the input also being connected with the output from the op amp 118 through a resistor 128. The op amp 126 output is connected through a diode 130 with a non-inverting input to a break-in hangover timer op amp 132, the output from which is coupled both through a diode 134 with an inverting input to an op amp 136, and through a diode 138 with the gates of the transmit channel attenuation pad FETs 60 and 62.

The circuit arrangement is such that in the absence of speech energy on the transmit channel in excess of a level determined by a threshold voltage established at an inverting input to the op amp 120 through a pair of resistors 140 and 142, the output from the op amp 120 is negative and, irrespective of whether speech energy on the transmit channel is in excess of that on the receive channel, the noninverting input to the op amp 126 is maintained negative and the op amp is disabled from responding to an output from the op amp 118. Under this circumstance, the output from the op amp 126 is negative and the diode 130 is reverse biased. The output from the op amp 132 therefore is negative, the diodes 134 and 138 are reverse biased, and the op amp 132 is effectively disconnected from both the op amp 136 and the transmit channel suppression FETs 60 and 62.

Upon the occurrence of speech energy on the transmit channel in excess of the level determined by the threshold voltage at the inverting input to the op amp 120, the output from the op amp goes positive and reverse biases the diode 122, thereby effectively disconnecting the op amp 120 from the op amp 126 and enabling the op amp 126 to respond to an input from the nonlinear summing op amp 118. Should speech energy on the transmit channel also be in excess of that on the receive channel, as indicated by a positive output from the op amp 118, comparator op amp 126 produces a positive output and the echo suppressor then operates in its break-in mode to remove suppression, if any, from the transmit channel, and to insert suppression into the receive channel. That is, the op amp 118 output becomes positive and provides at the noninverting input to the op amp 126 a voltage which is positive with respect to that at the inverting input. This causes a positive output from the op amp to be applied through the diode 130 to the noninverting input to the op amp 132 to generate a positive output therefrom. The positive output is then applied through the diode 134 to the inverting input to the op amp 136, generating a negative output therefrom to render the receive channel FET 38 conductive to insert attenuation into the receive channel, and through the diode 138 to the gates of the transmit channel suppression switch FETs 60 and 62 to render the FET 60 conductive and the FET 62 nonconductive, if then in opposite states, to remove suppression from the transmit channel. In this manner, a near end subscriber may interrupt a far end subscriber.

Upon transmit channel speech energy level either decreasing below the level established by the threshold voltage at the op amp 120 or below the level of speech energy on the receive channel as detected by the op amp 118, the noninverting input to the op amp 126 becomes negative with respect to the inverting input, and the output from the op amp goes negative and reverse biases the diode 130. Approximately 150 milliseconds after this occurs, as determined by a break-in hangover timer comprised of a pair of resistors 144 and 146 and a capacitor 148 connected with the noninverting input to the op amp 132, the output from the op amp 132 again becomes negative and reverse biases the diodes 134 and 138. This immediately disconnects the op amp 132 from the transmit channel FETs 60 and 62, thereby returning control over suppression in the transmit channel to the level of speech energy in the receive channel, and removes control over suppression in the receive channel after a delay of about 450 milliseconds, as determined by a delay circuit comprised of a pair of resistors 150 and 152 and a capacitor 154 connected with the inverting input to the op amp 136. The initial 150 millisecond delay prevents spurious removal of suppression from the transmit channel in response to momentary pauses in the near end speaker's voice, and the subsequent 450 milliseconds delay in the removal of attenuation from the receive channel ensures attenuation of delayed echo signals in a long delay transmission path.

The foregoing description dealt primarily with the voice-switched echo suppression functions of the echo suppressor. In accordance with another facet of the invention, means are provided to render the echo suppressor transparent to SF signaling tone in either direction of transmission on the four-wire transmission circuit, so that the tone has no effect on the suppression or break-in modes of the echo suppressor, or vice versa, and so that whenever SF tone appears at an input to the echo suppressor, the tone is present at the corresponding output independent of the suppression or break-in state of the echo suppressor. In accordance with one mode of operation, upon the occurrence of augmented SF tone such as occurs during dial pulsing or whenever SF tone first appears, the echo suppressor is disabled, whereby the SF tone is transmitted unaltered therethrough during critical signaling periods completely without distortion. In accordance with another mode of operation, upon the occurrence of steady low level SF tone in the transmit channel, the tone is blocked prior to the suppression control circuit and switch and reinserted back into the channel thereafter, irrespective of whether or not speech energy is simultaneously present in the channel, whereby the echo suppressor may simultaneously operate in its voice-switched echo suppression mode. In any event, SF signaling tone is transmitted unaltered through the receive channel of the echo suppressor.

Considering first the transmission of SF tones through the receive channel, such tones customarily are at 2600 Hz, and the receive channel voice energy level detecting circuit is desensitized to a narrow band of frequencies about 2600 Hz, which prevents insertion of suppression loss into the transmit channel as a result of SF tone in the receive channel. Also, during the break-in operation of the echo suppressor, a sharply tuned circuit prevents insertion of the 6 dB receive channel loss for a narrow band of frequencies centered at 2600 Hz.

More particularly, to prevent suppression from being inserted into the transmit channel in response to the presence of SF tone in the receive channel, an SF tone responsive filter including an op amp 200 is connected with the input to the lowpass filter 68. The tone responsive filter effectively shunts from the input to the filter 68 a narrow band of frequencies centered at 2600 Hz, thereby preventing SF tone from entering the filter and affecting insertion of suppression into the transmit channel. To prevent SF tone from being attenuated when the echo suppressor is in the break-in mode, a band elimination filter comprised of a capacitor 202 and a coil 204, selected to block a narrow band of frequencies centered about 2600 Hz, is in series with the receive channel attenuation FET 38. Consequently, SF signaling tone in the receive channel is not attenuated, even during the break-in mode when the FET 38 is in its conducting state, and does not interfere in any manner with the echo suppression function of the echo suppressor.

Considering now the operation of the echo suppressor in the presence of SF signaling tone on the transmit channel, the band elimination filter 66, which is the SF tone blocking or removing means, is insertable into and removable from the channel in accordance with the presence or absence of the tone. In the absence of the tone the band elimination filter is not inserted into the channel. Should SF tone occur, however, the band elimination filter is inserted into the channel approximately 425 milliseconds after initial occurrence of the tone, and when inserted attenuates energy in the channel in a narrow band centered at 2600 Hz by about 55 dB. Upon its insertion, a 2600 Hz oscillator 206 is simultaneously connected with the channel output port, whereby SF tone continuity is maintained through the channel. For the first 425 milliseconds following each appearance of SF tone in the channel the suppression switch FETs 60 and 62 are disabled, and the band elimination filter and oscillator are not inserted. Thus, dial pulses and other intermittent signaling tones are transmitted directly through the transmit channel without attenuation or distortion, and the echo suppressor is therefore transparent to SF tone during critical signaling periods. The timing interval associated with disabling is re-set by each new appearance of tone at the input terminals, so that the echo suppressor remains disabled, for example, during the entire sequence of digits in a dial pulse train. Only after incoming SF tone level has decayed to an idle level, as compared with the augmented level which occurs for approximately 400 milliseconds whenever the tone first appears, are the band elimination filter and oscillator inserted into the channel. In any event, whenever SF tone appears at the input port to the transmit channel, SF tone is present at the output port.

More particularly, in the absence of SF tone on the transmit channel the band elimination filter shunt FET 64 is conductive and a FET 208, connected in series with the output from the filter, is nonconductive. This disconnects or removes the band elimination filter from the channel, while simultaneously providing a shunt path around the filter through the FET 64 and a resistor 210.

To detect the presence of SF tone in the transmit channel, and to control the insertion and removal of the band elimination filter 66 and tone oscillator 206 into and from the channel in accordance therewith, a signal-to-guard comparison circuit is provided that indicates the presence of SF tone when the energy level of the tone exceeds an attenuated aggregate level of all of the energy on the channel by 8 to 12 dB. Then, approximately 425 milliseconds after detecting the tone, the comparison circuit is desensitized to the presence of non-tone energy in the channel. This prevents spurious insertion and removal of the band elimination filter and oscillator, and ensures that SF tone continuity is maintained even in the presence of relatively high signal or noise levels on the channel. Desensitization of the comparison circuit also advantageously permits the echo suppressor to operate properly when SF tone and dial tone are simultaneously present on the transmit channel.

The signal-to-guard SF tone detecting circuit includes a first op amp 212 connected at its noninverting input with the transmit channel through a guard path including attenuating resistors 214a-d, and a second op amp 216 connected at its noninverting input with the output from a band pass portion on the filter 66 through a relatively low loss signal path including a resistor 218. The band pass portion of the filter 66 is substantially transparent to SF signaling tone frequency, and the resistors 214a-d provide fixed attenuation for all of the transmit channel signal energy in the guard path. The result is that the op amp 216 receives at its noninverting input only SF tone energy on the transmit channel while the op amp 212 receives the attenuated aggregate energy. The positive portions of the signals at the output from the op amp 212 are passed through a diode 220 to one side of a resistor 222, and the negative portions of the SF tone at the output from the op amp 216 are passed through a diode 224 to one side of a resistor 226, the resistors 222 and 226 being connected as summing resistors and providing at their juncture a voltage the level of which is representative of the relative levels of the attenuated aggregate energy on the channel and of the SF signaling energy only.

The juncture of the summing resistors 222 and 226 is connected with the inverting input to the op amp 228, the output from which represents the results of the signal-to-guard comparison. The noninverting input to the op amp is connected to a source of reference potential, and the op amp therefore compares the level of the reference potential with the level of the signal at the juncture of the summing resistors 222 and 226. The relative component and voltage values are such that whenever the energy level of the SF tone in the transmit channel exceeds the attenuated aggregate level of the other energy in the channel by 8 to 12 dB, the output from the op amp 228 is positive or ground to indicate the presence of SF tone, and is negative otherwise.

The op amp 228 output is applied through a diode 230 and a resistor 232 to the noninverting input to an op amp 234, and through a diode 236 to the noninverting input to an op amp 238, the op amps 234 and 238 together comprising portions of a control and timing circuit for disabling the echo suppressor and for removing the band elimination filter and the tone generator from the transmit channel for a predetermined period following each occurrence of SF signaling tone thereon. The noninverting input to the op amp 238 is also connected through a resistor 240 with a timing circuit comprised of a resistor 242 and a capacitor 244, the inverting input is referenced to circuit common, and the output is connected through a resistor 246 with the inverting input to the op amp 234, the inverting input to the op amp 234 also being connected with ground through a resistor 248. The output from the op amp 238 is thus negative whenever SF tone is not present on the transmit channel, and for approximately 425 milliseconds after tone is detected, and is positive otherwise. To establish a reference potential at the noninverting input to the op amp 234, the input is connected with a source of negative potential through a resistor 250, and a resistor 252 and a capacitor 254 are connected in series between ground and the juncture of the diode 230 and the resistor 232 to prevent momentary changes in the output from the op amp 234 during intermittent signaling.

To desensitize the signal-to-guard circuit after the occurrence of SF signaling tone for approximately 425 milliseconds, the output from the op amp 238 is connected with the gate of a FET 256, the drain-source circuit of which is in series with a resistor 258 between the noninverting input to the op amp 212 and circuit common. To insert or remove the band elimination filter into or from the transmit channel the output from the op amp 238 is also connected with the gates of the FETs 64 and 208 for controlling the conductivity thereof, and to control insertion of the internally generated SF signaling tone into the transmit channel beyond the suppression switch the output is connected with the gate of a FET 260, the drain-source circuit of which connects the output from the oscillator 206 with the transmit channel output port beyond the suppression switch FETs. In order to remove attenuation, if any from the transmit and receive channels upon each occurrence of SF signaling tone on the transmit channel, whereby to render the echo suppressor completely transparent to the tone, the output from the op amp 234 is connected through a pair of diodes 262 and 264 with the gates of the FETs 60 and 62 for rendering the FET 60 conductive and the FET 62 nonconductive, and through a diode 265 with the gate of the FET 38 to render the FET nonconductive, for a period of approximately 425 milliseconds following each new occurrence of SF tone on the channel.

In the operation of the SF signaling tone sensing circuit, in the absence of SF tone on the transmit channel the output from the op amp 228 is negative. As a result, the diode 236 is forward biased, the capacitor 244 is charged to a negative potential, and the output from the op amp 238 is negative. This turns off the signal-to-guard circuit desensitizing FET 256, turns off the oscillator output FET 260 to disconnect the oscillator from the transmit channel, and turns the FET 208 off and the FET 64 on to remove the band elimination filter 66 from the transmit channel. A negative potential at the output from the op amp 228 also reverse biases the diode 230, with the result that the output from the op amp 234 is negative, the diodes 262, 264 and 265 are reverse biased, and the suppression switch FETs 38, 60 and 62 are under the control of the voice-actuated echo suppression portions of the echo suppressor.

Upon the occurrence of SF tone on the transmit channel of an energy level 8 to 12 dB greater than that of the attenuated aggregate energy level, the output from the op amp 228 goes from positive to ground. This forward biases the diode 230 to increase the voltage at the noninverting input to the op amp 234 and to provide a positive output therefrom, thereby forward biasing the diodes 262, 264 and 265 and immediately rendering the FET 60 conductive, the FET 62 nonconductive, and the FET 38 nonconductive to remove attenuation, if any, from the transmit and receive channels. This disables the echo suppressor, so that the transmit and receive channels are then transparent to and conduct therethrough SF signaling tone irrespective of the presence and level of other energy on the channels.

Changing of the output from the op amp 228 to ground in response to SF tone on the transmit channel also reverse biases the diode 236, the diode at this time then having a negative potential at its anode from the previously charged capacitor 244. As a result of the charge on the capacitor 244, the non-inverting input to the op amp 238 remains negative with respect to the inverting input, so that the output from the op amp remains negative. After about 425 milliseconds, however, the capacitor discharge sufficiently through the resistor 242 that the noninverting input to the op amp becomes positive with respect to the inverting input, and the output from the op amp goes to ground. When this occurs, the signal-to-ground desensitizing FET 256 is rendered conductive to reduce the gain in the guard path to the op amp 212 by approximately 20 dB, so that spurious reaction of the SF tone sensing circuit to high level signals or noise on the transmit channel is prevented. Thus, approximately 425 milliseconds after detection of SF signaling tone, the gain in the guard path of the signal-to-guard circuit is reduced to desensitize the circuit.

Upon the output from the op amp 238 changing to ground, several additional circuit changes also occur, whereby the echo suppressor is enabled to operate in its voice-switched echo suppression mode in the presence of SF tone, without interference to either. First, the FET 64 is rendered nonconductive and the FET 208 conductive to remove the bypass from around the band elimination filter and to insert the filter into the transmit channel. This filters out or removes SF signaling tone from the channel, but allows voice frequency signals to pass therethrough and to the voice energy level detecting circuitry. Second, the FET 260 of the local SF tone generator 206 is turned on, thereby connecting the output from the tone generator with the transmit channel and inserting SF tone into the channel subsequent to the speech level detecting circuitry and the suppression switch FETs 60 and 62, so that SF tone is provided at the output from the echo suppressor upon the occurrence of tone at the input thereto irrespective of whether or not the echo suppressor is in its suppression mode and despite the band elimination filter being inserted into the channel. Third, the voltage at the inverting input to the op amp 234 is increased to above that at the noninverting input, providing a negative transition at the output and reverse biasing the diode 262, which removes the override control on the transmit channel suppression FETs 60 and 62 and the receive channel attenuation FET 38 and returns control thereof to the voice-activated portions of the echo suppressor. Accordingly, approximately 425 milliseconds after the output from the op amp 228 becomes ground in response to SF tone on the transmit channel, and for as long as the tone persists, the band elimination filter is inserted into the transmit channel to remove or block incoming SF tone from the speech energy detecting and echo suppressing circuits of the channel, the oscillator 206 is connected with the channel beyond the echo suppression control circuitry to reinsert the tone back onto the channel, and the transmit and receive channel attenuation switches are returned to the control of the voice-switched echo suppressing portion of the circuit, whereby the echo suppressor simultaneously accommodates both telephone network signaling and voice-switched echo suppression.

Upon interruption or removal of SF signaling tone on the transmit channel, the output from the op amp 228 goes negative and forward biases the diode 236 to rapidly charge the capacitor 244 to a negative potential, the resistor 240 for this purpose being selected to have a relatively small value with respect to the resistor 242. This decreases the voltage at the noninverting input to the op amp 238 with respect to that at the inverting input, and causes a negative transition at the output therefrom. Accordingly, substantially immediately upon interruption or removal of SF tone from the transmit channel, the signal-to-guard desensitizing FET 256 is rendered nonconductive, the band elimination filter 66 is removed from the transmit channel, and the output from the local SF tone oscillator 206 is disconnected from the channel. This returns the SF tone sensing circuitry to its quiescent mode in preparation for a subsequent occurrence of SF tone on the transmit channel, and enables the echo suppressor to remain disabled and be completely transparent to SF signaling tone during critical periods of intermittent SF tone, such as during dial pulsing, since the intermittent tones are each shorter than the 425 millisecond disabled periods of the echo suppressor, and the SF sensing circuitry is reset following each occurrence of a tone.

It should be noted that the particular arrangement of the signal-to-guard SF tone sensing circuit prevents voice energy from interfering with proper operation of the tone sensing circuit. When a call is first being established between subscribers, intermittent SF signaling tone may be present on the transmit channel, but voice energy is absent. When intermittent tone is present, the tone energy level at the input to the op amp 216 is at least 8 to 12 dB greater than the attenuated aggregate energy level at the input to the op amp 212, which aggregate energy level is the SF tone energy on the transmit channel attenuated by the resistors 214a-d, and the output from the op amp 228 goes to ground to indicate the presence of SF tone. The sensing circuit then operates, as described, to disable the echo suppressor.

Thereafter, and prior to the occurrence of voice energy on the transmit channel, SF signaling tone on the channel either decays to an idle, continuous level, in which case the band elimination filter 66 is inserted into and the oscillator 206 is connected with the channel, as described, or the tone is removed. Should the tone be continuously present at an idle level, then the desensitizing FET 256 is conductive, and attenuation is significantly increased in the guard path so that the SF tone at the input to the op amp 216 always remains at least 8 to 12 dB greater than the attenuated aggregate energy level at the op amp 212, irrespective of the level of speech or other energy on the transmit channel, and accidental removal of the band elimination filter and oscillator are prevented.

In the event that idle level SF tone is absent on the transmit channel, input signals to the op amp 216 from the band pass filter are nevertheless occasionally present as a result of the normal occurrence of speech energy at signaling tone frequency. When this occurs, however, an output is not provided from the signal-to-guard comparison circuit to disable the echo suppressor, since at this time the input to the op amp 212, which is the attenuated aggregate energy level on the transmit channel (energy at SF tone frequency plus energy at all other frequencies), is not 8 to 12 dB less than that at the op amp 216. Accordingly, by comparing SF tone with the attenuated aggregate energy on the transmit channel, spurious disabling of the echo suppressor, in response to the occurrence of speech energy at SF signaling tone frequency, is prevented.

The SF tone sensing circuit thus compares the energy level of SF tone on the transmit channel with the energy level of a guard signal derived therefrom to accurately control the operation of the echo suppressor in the presence of SF tone. Although in the particular description of the SF tone sensing circuit the guard signal has been considered to have been derived from the signal at the output from the op amp 50, the teachings of the invention also contemplate other means for deriving a suitable guard signal. For example, the guard signal applied to the noninverting input to the op amp 212 could be obtained at the output from the band elimination filter 66, and in such case would be the signal on the transmit channel as attenuated by the removal of signal frequencies centered about that of SF tone.

The invention thus provides an improved echo suppressor particularly adapted for use in four-wire telephone transmission circuits at points intermediate to SF signaling units. Because the echo suppressor is disabled for the first 425 milliseconds following each occurrence of SF signaling tone, during critical periods of intermittent SF tone signaling the echo suppressor is and remains completely transparent to the tones, and passes the same therethrough completely without distortion. By virtue of the removal of continuous SF tone, or tone in excess of 425 milliseconds, from the transmit channel of the echo suppressor, and reinsertion of the tone back into the channel subsequent to the voice energy detecting circuitry and suppression switch, the echo suppressor advantageously is able to provide voice-switched echo control without affecting network signaling, even in applications characterized by the simultaneous presence of speech energy and signaling tone on a four-wire transmission circuit.

While embodiments of the invention have been described in detail, various modifications and other embodiments thereof may be devised by one skilled in the art without departing from the spirit and scope of the invention, as defined by the appended claims.

What is claimed is:

1. In an echo suppressor for telephone systems having separate transmit and receive channels on which signaling tone is at least occasionally present, an attenuation pad for the receive channel; means coupled with the transmit channel and said attenuation pad for detecting the level of energy on the transmit channel and for controlling operation of said attenuation pad to insert and remove attenuation into and from the receive channel in accordance with the energy level being greater than or less than, respectively, selected levels; an attenuation pad for the transmit channel, means coupled with the receive channel and said transmit channel attenuation pad for detecting the level of energy on the receive channel and for controlling operation of said transmit channel attenuation pad to insert and remove attenuation into and from the transmit channel at a point subsequent to the point whereat the energy on the transmit channel is detected in accordance with the receive channel energy level being greater than or less than, respectively, selected levels; means coupled with the transmit channel for removing signaling tone therefrom prior to said detecting means and said transmit channel attenuation pad, said removing means including signaling tone blocking means for the transmit channel, said blocking means having an active state in which signaling tone is removed from the transmit channel and an inactive state in which it is not; means for sensing the presence or absence of signaling tone on the transmit channel and for controlling operation of said blocking means to place the same in its active and inactive states, respectively, in accordance therewith; and means coupled with the transmit channel for generating signaling tone thereon subsequent to said transmit channel attenuation pad whenever said blocking means is removing signaling tone, so that said echo suppressor does not interfere with signaling tone on the transmit channel and signaling tone does not affect operation of said detecting means.

2. In an echo suppressor as in claim 1, wherein said means for sensing is coupled with said means for generating for controlling operation of the same in accordance with said blocking means being in its active or inactive states, such that whenever said blocking means is in its active state and removes signaling tone from the channel prior to said detecting means said generating means provides signaling tone on the channel subsequent to said transmit channel attenuation pad.

3. In an echo suppressor as in claim 2, said blocking means comprising a band elimination filter for the transmit channel, said band elimination filter blocking signaling tone but passing therethrough other signals, and switch means in series and in shunt with said band elimination filter, wherein said sensing means is coupled with said switch means to open said shunt switch means and close said series switch means to effectively insert said band elimination filter into the transmit channel and place said blocking means in its active state, and to close said shunt switch means and open said series switch means to effectively remove said band elimination filter from the channel and place said blocking means in its inactive state.

4. In an echo suppressor as in claim 2, said means for generating signaling tone comprising a signaling tone frequency oscillator having an output connectable with the transmit channel subsequent to said transmit channel attenuation pad through a switch means, and wherein said means for sensing is coupled with said switch means for closing and opening said switch means to connect and disconnect, respectively, said oscillator output with and from the transmit channel.

5. In an echo suppressor as in claim 1, including delay means coupled with said sensing means for delaying placement of said blocking means into its active state for a predetermined time after each occurrence of signaling tone on the transmit channel.

6. In an echo suppressor as in claim 1, said sensing means comprising means connected with the transmit channel for generating an attenuated signal of the aggregate signal on the channel, and means for comparing the level of signaling tone energy on the transmit channel with the energy level of said attenuated signal and for placing said blocking means in its active and inactive states in accordance with the difference in levels being greater than or less than, respectively, predetermined amounts.

7. In an echo suppressor as in claim 6, said comparing means placing said signaling tone blocking means in its active and inactive states in accordance with said signaling tone energy level exceeding said attenuated aggregate signal energy level by more than or less than, respectively, a predetermined amount, and including means for increasing the attenuation of said attenuated aggregate signal after said signaling tone energy level exceeds said attenuated signal energy level by said predetermined amount for a predetermined time, so that said signaling tone energy level must then decrease to an overall lower level with respect to the aggregate signal energy level for said comparing means to remove said blocking means from the transmit channel.

8. An echo suppressor for telephone systems having separate transmit and receive channels on which signaling tone is at least occasionally present, comprising an attenuation pad for the transmit channel; means coupled with the receive channel for detecting the level of energy thereon and for controlling operation of said attenuation pad to insert and remove attenuation into and from the transmit channel in accordance with the energy level being greater than or less than, respectively, selected levels; signaling tone blocking means for the transmit channel, said blocking means having an active state in which it removes signaling tone from the transmit channel prior to said attenuation pad and an inactive state in which it does not; means for sensing the presence or absence of signaling tone on the transmit channel and for controlling operation of said blocking means to place the same in its active and inactive states, respectively, in accordance therewith, and a signaling tone generator coupled with the transmit channel subsequent to said attenuation pad, wherein said means for sensing is coupled with said signaling tone generator for controlling operation of the same in accordance with said blocking means being in its active or inactive states, such that said signaling tone generator inserts signaling tone on the transmit channel subsequent to said attenuation pad whenever said blocking means is in its active state and removing signaling tone from the channel prior to said attenuation pad.

9. An echo suppressor as in claim 8, including delay means coupled with said sensing means for delaying placement of said blocking means into its active state and operation of said signaling tone generator to insert signaling tone on the transmit channel for a first period of time after each occurrence of signaling tone thereon, wherein said sensing means is coupled with said attenuation pad and controls operation of the same to remove attenuation from the transmit channel during said first period of time irrespective of the level of energy on the receive channel.

10. An echo suppressor as in claim 8, said sensing means comprising means connected with the transmit channel for generating an attenuated signal of the aggregate signal on the channel, means for comparing the level of signaling tone energy on the transmit channel with said attenuated signal energy level and for generating an output indicative of the presence of signaling tone on the channel whenever said signaling tone energy level exceeds said attenuated signal energy level by at least a predetermined amount, and including delay means coupled with said comparing means output, said blocking means, said signaling tone generator and said attenuation pad for delaying placement of said blocking means into its active state, insertion of said signaling tone on the transmit channel, and insertion of attenuation into the transmit channel under control of the receive channel energy level, until after a first period of time following each occurrence of an output from said comparing means.

11. An echo suppressor as in claim 10, including means for increasing the attenuation of said attenuated aggregate signal after said first period of time, said comparing means then continuing to generate an output for so long as said signaling tone energy level exceeds said attenuated signal energy level by said predetermined amount, said output after said first period of time maintaining said blocking means in its active state and insertion of signaling tone by said tone generator on the transmit channel.

12. An echo suppressor as in claim 8, said signaling tone blocking means including a band elimination filter for the transmit channel, said band elimination filter blocking only signaling tone energy from passing therethrough, and a pair of switches connected in series and in shunt with said filter, wherein said sensing means is coupled with said switches for closing said series switch and opening said shunt switch to effectively insert said band elimination filter into the transmit channel and place said blocking means in its active state and for opening said series switch and closing said shunt switch to effectively remove said band elimination filter from said channel and place said blocking means in its inactive state, and wherein an output from said signaling tone generator is connected with the transmit channel through a third switch and said sensing means is coupled with said third switch for closing and opening said switch to connect and disconnect, respectively, said signaling tone generator output with and from the transmit channel.

13. An echo suppressor for telephone systems having separate transmit and receive channels on which single frequency (SF) signaling tone is at least occasionally present, comprising an attenuation pad for the transmit channel; means coupled with the receive channel for detecting the level of energy thereon and for controlling operation of said attenuation pad to insert and remove attenuation into and from the transmit channel in accordance with the energy level being greater than or less than, respectively, selected levels; an attenuation pad for the receive channel; means coupled with the transmit channel for detecting the level of energy thereon and for controlling operation of said receive channel attenuation pad to insert and remove attenuation into and from the receive channel in accordance with the transmit channel energy level being greater than or less than, respectively, selected levels, and for controlling operation of said transmit channel attenuation pad to remove attenuation from the transmit channel upon attenuation being inserted into the receive channel; SF signaling tone attenuation means for the transmit channel; means for sensing the presence or absence of SF signaling tone on the transmit channel and for controlling operation of said signaling tone attenuation means to insert and remove, respectively, signaling tone attenuation into and from the transmit channel, prior to said transmit channel energy level detecting means and attenuation pad, in accordance therewith; and an SF signaling tone generator for the transmit channel, wherein said sensing means is coupled with said generator for connecting an output from said generator with the transmit channel subsequent to said transmit channel detecting means and attenuation pad whenever signaling tone attenuation is inserted into the transmit channel, whereby to reinsert signaling tone on the channel, and for disconnecting said generator output from the transmit channel whenever signaling tone attenuation is removed from the channel.

14. An echo suppressor as in claim 13, including first filter means coupled with said receive channel for preventing attenuation of SF signaling tone on the receive channel when said receive channel attenuation pad inserts attenuation therein, and second filter means coupled with said receive channel energy level detecting means for preventing said detecting means from receiving signaling tone.

15. An echo suppressor as in claim 13, including delay means coupled with said SF signaling tone sensing means for delaying insertion of signaling tone attenuation into and generation of signaling tone on the transmit channel for a first period of time after sensing of signaling tone on the channel, wherein said sensing means is coupled with said transmit and receive channel attenuation pads for controlling the same to remove attenuation from the transmit and receive channels upon the sensing of signaling tone on the transmit channel and for said first period of time irrespective of the transmit or receive channel energy levels, so that upon sensing of SF signaling tone on the transmit channel and for the first period of time the signaling tone passes unaltered through said echo suppressor, and so that after said first period of time said SF signaling tone is attenuated by said signaling tone attenuation means prior to said transmit channel energy level detecting means and attenuation pad, signaling tone is reinserted thereafter onto the transmit channel by said signaling tone generator, and said transmit and receive channel attenuation pads are released from control by said sensing means, whereby said echo suppressor operates in the simultaneous presence of voice signals and SF signaling tones.

16. An echo suppressor as in claim 15, wherein said signaling tone sensing means comprises means connected with the transmit channel prior to said transmit channel energy level detecting means for generating an attenuated signal of the aggregate signal on the channel, and means for comparing the level of signaling tone energy on the transmit channel prior to said transmit channel energy level detecting means with said attenuated signal energy level and for generating an output indicative of the presence of SF signaling tone upon said signaling tone energy level exceeding said attenuated signal energy level by a predetermined amount.

17. An echo suppressor as in claim 16, including means coupled with said delay means for increasing the attenuation of said attenuated aggregate signal after said first period of time, so that said signaling tone energy level must then decrease to an overall lower level with respect to the aggregate signal energy level for remove of signaling tone attenuation from and discontinuance of insertion of signaling tone on the transmit channel, whereby spurious insertion and removal of signaling tone attenuation and spurious generation of signaling tone on the transmit channel are prevented.

18. An echo suppressor as in claim 15, said SF signaling tone attenuation means comprising a band elimination filter tuned to the frequency of the signaling tone, and a switch means in series with and a switch means in shunt with said band elimination filter, wherein said sensing means is coupled with both said switch means and opens said shunt switch means and closes said series switch means to insert, and closes said shunt switch means and opens said series switch means to remove, signaling tone attenuation into and from the transmit channel.

19. An echo suppressor as in claim 15, said SF signaling tone generator comprising a signaling tone frequency oscillator and switch means for selectively establishing a connection between an output from said oscillator and said transmit channel, wherein said sensing means is coupled with said switch means for controlling the establishing of said connection.

20. A method of providing voice echo control on a telephone system having separate transmit and receive channels on which signaling tone is at least occasionally present, comprising the steps of detecting the level of energy on the receive channel; inserting and removing attenuation into and from the transmit channel at a first point thereon in accordance with the energy level on the receive channel being greater than or less than, respectively, selected levels; detecting the level of energy on the transmit channel at a second point thereon prior to said first point; inserting and removing attenuation into and from the receive channel in accordance with the energy level at the second point being greater than or less than, respectively, selected levels; sensing the presence or absence of signaling tone on the transmit channel prior to said second point; removing, after a predetermined period following sensing the presence of signaling tone, the signaling tone from the transmit channel prior to said second point; removing attenuation from the transmit channel at said first point upon sensing the presence of signaling tone and for said predetermined period, whereby upon the occurrence of signaling tone the tone passes unaltered through the transmit channel for said predetermined period and after said predetermined period the signaling tone energy is not detected at said second point and does not control insertion and removal of attenuation into and from the receive channel; and inserting signaling tone onto the transmit channel subsequent to said first point upon signaling tone being removed therefrom prior to said second point so that whenever signaling tone is present prior to said second point it is present subsequent to said first point irrespective of any insertion of attenuation at said first point.

21. A method as in claim 20, said sensing step comprising deriving an attenuated signal of the aggregate signal on the transmit channel prior to said second point, comparing the energy level of signaling tone on the transmit channel prior to said second point with the attenuated signal energy level and generating an output representative of the presence of signaling tone upon said signaling tone energy level exceeding said attenuated signal energy level by a predetermined amount, and effecting said removing and inserting steps in response to said output being generated.

22. A method of providing voice echo control on a telephone system having separate transmit and receive channels on which single frequency (SF) signaling tone is at least occasionally present, comprising the steps of detecting the level of energy on the receive channel; inserting and removing attenuation into and from the transmit channel at a first point thereon in accordance with the level of energy on the receive channel being greater than or less than, respectively, selected levels; detecting at a second point on the transmit channel, prior to said first point, the level of energy thereon; inserting and removing attenuation into and from the receive channel in accordance with the level of energy on the transmit channel at said second point being greater than or less than, respectively, selected levels and removing the attenuation, if any, on the transmit channel when attenuation is inserted into the receive channel; sensing the presence or absence of SF signaling tone on the transmit channel at a third point thereon which is prior to said second point; removing, after a predetermined period following sensing the presence of SF signaling tone at said third point, the signaling tone from the transmit channel prior to said second point; removing attenuation from the transmit and receive channels upon sensing the presence of said tone and for said predetermined period, whereby upon the occurrence of signaling tone on the transmit channel signaling tone passes unaltered through the transmit and receive channels for said predetermined period and after said predetermined period signaling tone energy is not detected at said second point and does not control insertion and removal of attenuation into and from the receive channel; and inserting signaling tone onto the transmit channel subsequent to said first point whenever said tone is being removed prior to said second point so that whenever signaling tone is present on the transmit channel at said third point it is present subsequent to said first point irrespective of any insertion of attenuation at said first point.

23. A method as in claim 22, including the step of always passing SF signaling tone through the receive channel without attenuation thereof.

24. A method as in claim 22, said sensing step comprising deriving an attenuated signal of the aggregate signal on the transmit channel at said third point, comparing the relative energy levels of the SF signaling tone on the transmit channel at said third point and of the attenuated signal and generating a control signal representative of the presence of signaling tone upon the signaling tone energy level exceeding the attenuated signal energy level by at least a predetermined amount, and effecting said signaling tone removing and inserting steps in response to said control signal being generated.

* * * * *